(12) United States Patent
Jeong et al.

(10) Patent No.: US 7,419,548 B2
(45) Date of Patent: Sep. 2, 2008

(54) LIQUID CRYSTAL DISPENSING APPARATUS HAVING SEPARABLE LIQUID CRYSTAL DISCHARGING PUMP

(75) Inventors: Jae-Gyu Jeong, Daegu (KR); Soo-Min Kwak, Gyeongsangbuk-Do (KR); Hae-Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/874,220

(22) Filed: Jun. 24, 2004

(65) Prior Publication Data

US 2004/0265479 A1   Dec. 30, 2004

(30) Foreign Application Priority Data

Jun. 24, 2003   (KR) ............ 10-2003-0041278

(51) Int. Cl.
- B05C 5/00 (2006.01)
- B05C 3/00 (2006.01)
- B05C 11/00 (2006.01)
- B65B 1/04 (2006.01)
- B67D 5/40 (2006.01)

(52) U.S. Cl. .......... 118/300; 118/683; 118/323; 118/712; 141/67; 141/95; 239/333; 222/373; 222/378

(58) Field of Classification Search ......... 118/323, 118/692–694, 680–683, 300, 305, 712; 239/302, 239/331–333; 222/322, 325, 372, 373, 378–385; 417/460–469; 91/155, 169.1, 170.1, 172; 141/67, 95, 100, 98, 198; 427/427.1, 427.3
See application file for complete search history.

(56) References Cited

U.S. PATENT DOCUMENTS

| | | | |
|---|---|---|---|
| 3,168,872 A | * | 2/1965 | Pinkerton ............ 417/492 |
| 3,220,351 A | * | 11/1965 | Kling ............ 417/458 |
| 3,978,580 A | | 9/1976 | Leupp et al. |
| 4,094,058 A | | 6/1978 | Yasutake et al. |
| 4,501,192 A | * | 2/1985 | Knodel ............ 92/248 |
| 4,653,864 A | | 3/1987 | Baron et al. |
| 4,691,995 A | | 9/1987 | Yamazaki et al. |
| 4,775,225 A | | 10/1988 | Tsuboyama et al. |
| 5,247,377 A | | 9/1993 | Omeis et al. |
| 5,263,888 A | | 11/1993 | Ishihara et al. |
| 5,312,233 A | * | 5/1994 | Tanny et al. ............ 417/316 |
| 5,379,139 A | | 1/1995 | Sato et al. |

(Continued)

FOREIGN PATENT DOCUMENTS

EP   1 003 066   5/2000

(Continued)

*Primary Examiner*—Yewebdar T Tadesse
(74) *Attorney, Agent, or Firm*—McKenna, Long & Aldridge LLP

(57) ABSTRACT

A liquid crystal dispensing apparatus includes a container to contain liquid crystal, a discharge pump, and a nozzle to dispense liquid crystal from the discharge pump onto a substrate. The discharge pump has a separably formed case, a cylinder received in the case, a piston inserted into the cylinder and having a groove at a lower portion such that the piston draws in and discharges liquid crystal by rotating and moving up-down, and a suction opening and a discharge opening through which liquid crystal is to be respectively drawn in and discharged as the piston is moved.

18 Claims, 12 Drawing Sheets

U.S. PATENT DOCUMENTS

| | | | |
|---|---|---|---|
| 5,406,989 | A | 4/1995 | Abe |
| 5,499,128 | A | 3/1996 | Hasegawa et al. |
| 5,507,323 | A | 4/1996 | Abe |
| 5,511,591 | A | 4/1996 | Abe |
| 5,539,545 | A | 7/1996 | Shimizu et al. |
| 5,548,429 | A | 8/1996 | Tsujita |
| 5,642,214 | A | 6/1997 | Ishii et al. |
| 5,674,055 | A * | 10/1997 | Nimberger et al. .......... 417/313 |
| 5,680,189 | A | 10/1997 | Shimizu et al. |
| 5,742,370 | A | 4/1998 | Kim et al. |
| 5,757,451 | A | 5/1998 | Miyazaki et al. |
| 5,807,085 | A * | 9/1998 | Yajima ................ 417/505 |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,183,231 | B1 * | 2/2001 | Van Norman ............ 418/206.6 |
| 6,190,739 | B1 * | 2/2001 | Hoffer et al. .............. 427/424 |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,558,127 | B2 * | 5/2003 | Maruyama et al. ......... 417/44.1 |
| 2001/0021000 | A1 | 9/2001 | Egami |
| 2004/0011422 | A1 | 1/2004 | Ryu et al. |
| 2004/0241023 | A1 * | 12/2004 | Pinkerton et al. ........... 417/461 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |

| | | | | | | |
|---|---|---|---|---|---|---|
| JP | 2001-13506 | 1/2001 | | JP | 2002-82340 | 3/2002 |
| JP | 2001-33793 | 2/2001 | | JP | 2002-90759 | 3/2002 |
| JP | 2001-42341 | 2/2001 | | JP | 2002-90760 | 3/2002 |
| JP | 2001-51284 | 2/2001 | | JP | 2002-107740 | 4/2002 |
| JP | 2001-66615 | 3/2001 | | JP | 2002-122870 | 4/2002 |
| JP | 2001-91727 | 4/2001 | | JP | 2002-122872 | 4/2002 |
| JP | 2001-117105 | 4/2001 | | JP | 2002-122873 | 4/2002 |
| JP | 2001-117109 | 4/2001 | | JP | 2002-131762 | 5/2002 |
| JP | 2001-133745 | 5/2001 | | JP | 2002-139734 | 5/2002 |
| JP | 2001-133794 | 5/2001 | | JP | 2002-156518 | 5/2002 |
| JP | 2001-133799 | 5/2001 | | JP | 2002-169166 | 6/2002 |
| JP | 2001-142074 | 5/2001 | | JP | 2002-169167 | 6/2002 |
| JP | 2001-147437 | 5/2001 | | JP | 2002-182222 | 6/2002 |
| JP | 2001-154211 | 6/2001 | | JP | 2002-202512 | 7/2002 |
| JP | 2001-166272 | 6/2001 | | JP | 2002-202514 | 7/2002 |
| JP | 2001-166310 | 6/2001 | | JP | 2002-214626 | 7/2002 |
| JP | 2001-183683 | 7/2001 | | JP | 2002-229042 | 8/2002 |
| JP | 2001-201750 | 7/2001 | | JP | 2002-236276 | 8/2002 |
| JP | 2001-209052 | 8/2001 | | JP | 2002-258299 | 8/2002 |
| JP | 2001-209056 | 8/2001 | | JP | 2002-236292 | 9/2002 |
| JP | 2001-209057 | 8/2001 | | JP | 2002-277865 | 9/2002 |
| JP | 2001-209058 | 8/2001 | | JP | 2002-277866 | 9/2002 |
| JP | 2001-209060 | 8/2001 | | JP | 2002-277881 | 9/2002 |
| JP | 2001-215459 | 8/2001 | | JP | 2002-287156 | 10/2002 |
| JP | 2001-222017 | 8/2001 | | JP | 2002-296605 | 10/2002 |
| JP | 2001-235758 | 8/2001 | | JP | 2002-311438 | 10/2002 |
| JP | 2001-255542 | 9/2001 | | JP | 2002-311440 | 10/2002 |
| JP | 2001-264782 | 9/2001 | | JP | 2002-311442 | 10/2002 |
| JP | 2001-272640 | 10/2001 | | JP | 2002-323687 | 11/2002 |
| JP | 2001-281675 | 10/2001 | | JP | 2002-323694 | 11/2002 |
| JP | 2001-281678 | 10/2001 | | JP | 2002-333628 | 11/2002 |
| JP | 2001-282126 | 10/2001 | | JP | 2002-333635 | 11/2002 |
| JP | 2001-305563 | 10/2001 | | JP | 2002-333843 | 11/2002 |
| JP | 2001-330837 | 11/2001 | | JP | 2002-341329 | 11/2002 |
| JP | 2001-330840 | 11/2001 | | JP | 2002-341355 | 11/2002 |
| JP | 2001-356353 | 12/2001 | | JP | 2002-341356 | 11/2002 |
| JP | 2001-356354 | 12/2001 | | JP | 2002-341357 | 11/2002 |
| JP | 2002-14360 | 1/2002 | | JP | 2002-341358 | 11/2002 |
| JP | 2002-23176 | 1/2002 | | JP | 2002-341359 | 11/2002 |
| JP | 2002-49045 | 2/2002 | | JP | 2002-341362 | 11/2002 |
| JP | 2002-079160 | 3/2002 | | KR | 2000-0035302 | 6/2000 |
| JP | 2002-080321 | 3/2002 | | * cited by examiner | | |

LIQUID CRYSTAL DISPENSING APPARATUS HAVING SEPARABLE LIQUID CRYSTAL DISCHARGING PUMP

The present application claims the benefit of Korean Patent Application No. 2003-41278 filed in Korea on Jun. 24, 2003. The present application further incorporates by reference U.S. patent application Ser. No. 10/421,714, which has published as US Patent Publication No. 2004-0011422-A1.

BACKGROUND OF THE INVENTION

1. Field of the Invention

The present invention relates to a liquid crystal manufacturing equipment, and more particularly, to a liquid crystal dispensing apparatus.

2. Description of the Related Art

Recently, various portable electric devices, such as mobile phones, personal digital assistants (PDAs), and notebook computers, have been developed because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of an LCD device according to the related art. In FIG. 1, an LCD device 1 comprises a lower substrate 5, an upper substrate 3, and a liquid crystal layer 7 formed therebetween. The lower substrate 5 is a driving device array substrate, and includes a plurality of pixels (not shown) and a driving device, such as a thin film transistor (TFT), formed on each pixel. The upper substrate 3 is a color filter substrate, and includes a color filter layer for reproducing real color. In addition, a pixel electrode and a common electrode are formed on the lower substrate 5 and the upper substrate 3, respectively. An alignment layer is formed on both the lower and upper substrates 5 and 3 to align liquid crystal molecules of the liquid crystal layer 7. The lower substrate 5 and the upper substrate 3 are attached along a perimeter by a sealant 9, and the liquid crystal 7 is confined within the perimeter. In operation, the liquid crystal molecules of the liquid crystal layer 7 are reoriented by the driving device formed on the lower substrate 5 to control amounts of light transmitted through the liquid crystal layer 7, thereby displaying an image.

FIG. 2 is a flow chart of a fabrication method for an LCD device according to the related art. In FIG. 2, a fabrication method includes three sub-processes for manufacturing an LCD device: a driving device array substrate process for forming the driving device on the lower substrate 5; a color filter substrate process for forming the color filter on the upper substrate 3; and a cell process.

In Step S101, a plurality of gate lines and data lines are formed on the lower substrate 5 to define a pixel area by the driving device array process, and the thin film transistor connected to both the gate line and the data line is formed on the each pixel area. In addition, a pixel electrode, which is to be connected to the thin film transistor to drive the liquid crystal layer according to a signal applied through the thin film transistor, is formed by the driving device array process. In Step S104, R, G, and B color filter layers for reproducing the color and a common electrode are formed on the upper substrate 3 by the color filter process.

In Steps S102 and S105, alignment layers are formed on the lower substrate 5 and the upper substrate 3. Then, the alignment layers are individually rubbed to induce surface anchoring (i.e. a pretilt angle and alignment direction) for the liquid crystal molecules of the liquid crystal layer 7. In Step S103, a spacer is dispersed onto the lower substrate 5 for maintaining a uniform cell gap between the lower and upper substrates 5 and 3. In Step S106, a sealant is printed along outer portions of the upper substrate 3.

In Step S107, the lower and upper substrates 5 and 3 are assembled together by compression. The lower substrate 5 and the upper substrate 3 are both made of glass substrates, and include a plurality of unit panel areas on which the driving device and the color filter layer are formed. In Step S108, the assembled upper and lower glass substrates 5 and 3 are cut into unit panels. In Step S109, liquid crystal material is injected into the gap formed between the upper and lower substrates 5 and 3 of the unit panels through a liquid crystal injection hole. The filled unit panel is completed by sealing the liquid crystal injection hole. In Step S110, the filled and sealed unit panel is tested.

FIG. 3 is a schematic view of a liquid crystal injection system for fabricating an LCD device according to the related art. In FIG. 3, a container 12 in which liquid crystal material 14 is contained is placed in a vacuum chamber 10, and the liquid crystal display panel 1 is located at an upper side of the container 12. Then, the vacuum chamber 10 is connected to a vacuum pump (not shown) to maintain a predetermined vacuum/pressure state within the vacuum chamber 10. In addition, a liquid crystal display panel moving device (not shown) is installed in the vacuum chamber 10 to move the liquid crystal display panel 1 from the upper side of the container 12 to a surface of the liquid crystal material 14, thereby contacting an injection hole 16 of the liquid crystal display panel 1 to the liquid crystal material 14. Accordingly, this method is commonly called as a liquid crystal dipping injection method.

When the vacuum/pressure level within the chamber 10 is decreased by an inflow of nitrogen gas ($N_2$) into the vacuum chamber 10 in the state that the injection hole 16 of the liquid crystal display panel 1 contacts the surface of the liquid crystal material 14, the liquid crystal material 14 is injected into the liquid crystal display panel 1 through the injection hole 16 by the pressure differential between the vacuum/pressure level within the liquid crystal display panel 1 and the pressure/level within the vacuum chamber 10. After the liquid crystal material 14 is completely filled into the liquid crystal display panel 1, the injection hole 16 is sealed by a sealant to seal the liquid crystal material 14 within the liquid crystal display panel 1. Accordingly, this method is called as a vacuum injection method.

However, there are several problems with both the liquid crystal dipping injection method and/or vacuum injection method. First, an overall time for injection of the liquid crystal material 14 into the panel 1 is relatively long for either method. In general, a gap thickness between the driving device array substrate and the color filter substrate in the liquid crystal display panel 1 is relatively narrow, i.e., a few micrometers. Accordingly, a relatively small amount of liquid crystal material 14 is injected into the liquid crystal display panel 1 per unit time. For example, it takes about 8 hours to completely inject the liquid crystal material 14 into a 15-inch liquid crystal display panel, and thus, fabricating efficiency is decreased. Second, consumption of the liquid crystal material 14 during the liquid crystal injection method is large. Only a small amount of the liquid crystal material 14 in the container 12 is actually injected into the liquid crystal display panel 1. Accordingly, during loading of the liquid crystal display panel 1 into the vacuum chamber 10, the unused liquid crystal material 14 is exposed to atmosphere or to certain gases, thereby contaminating the liquid crystal material 14. Thus, any remaining liquid crystal material 14 must be discarded after the injection of the liquid crystal material 14 into a plurality of liquid crystal display panels 1, thereby increasing fabricating costs.

SUMMARY OF THE INVENTION

Accordingly, the present invention is directed to a liquid crystal dispensing system and method of dispensing liquid crystal material using the same that substantially obviates one or more of the problems due to limitations and disadvantages of the related art.

An object of the present invention is to provide a liquid crystal dispensing apparatus that directly dispenses liquid crystal onto a glass substrate of a large area having at least one liquid crystal panel and a method of dispensing liquid crystal material using the same.

Another object of the present invention is to provide a liquid crystal dispensing apparatus that can be easily washed.

Another object of the present invention is to provide a liquid crystal dispensing apparatus that prevents the case from being misaligned, thereby preventing deformation caused by impacts or the like.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing apparatus comprises a container to contain liquid crystal; a discharge pump including a separably formed case, a cylinder received in the case, a piston inserted into the cylinder and having a groove at a lower portion such that the piston draws in and discharges liquid crystal by rotating and moving up-down, and a suction opening and a discharge opening through which liquid crystal is to be respectively drawn in and discharged as the piston is moved; and a nozzle to dispense liquid crystal from the discharge pump onto a substrate.

In another aspect, a discharge pump comprises a separably formed case; a cylinder received in the case; a piston inserted into the cylinder and having a groove at a lower portion to draw in, the piston discharging liquid crystal by rotating and moving up-down; a suction opening and a discharge opening through which liquid crystal is to be respectively drawn in and discharged as the piston moves; and a rotating member to which the piston is fixed to rotate the piston and to move the piston up-down.

In another aspect, a liquid crystal dispensing apparatus comprises a container to contain liquid crystal; a discharge pump having a separably formed case and a piston inserted into the case to draw in and discharge liquid crystal in accordance with an up-down motion of the piston; and a nozzle to dispense liquid crystal from the discharge pump onto a substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

To solve the problems of the related art liquid crystal injection methods such as a liquid crystal dipping method or a liquid crystal vacuum injection method, a liquid crystal dropping method has been recently introduced. The liquid crystal dropping method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in a LCD of larger area can be formed quickly. In addition, the liquid crystal consumption can be minimized due to the direct dropping of the liquid crystal as much as required amount, and therefore, the fabrication cost can be reduced.

Figure 4:
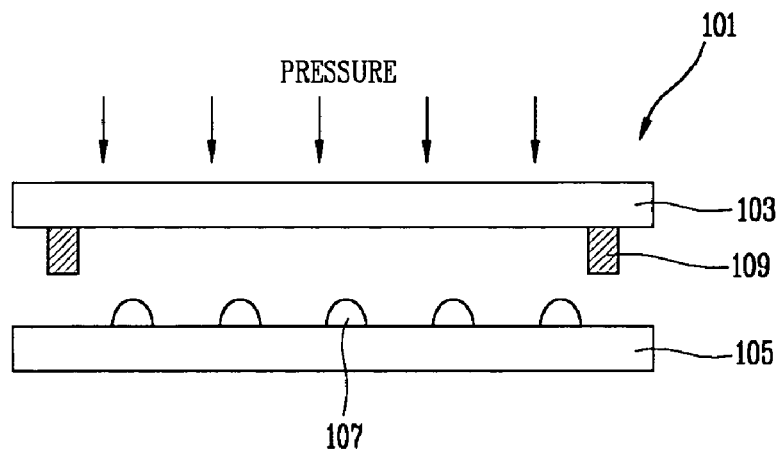
FIG. 4 is a cross sectional view of an LCD device fabricated by a liquid crystal dispensing method according to an embodiment of the present invention.

FIG. 4 is a view illustrating a basic concept of a liquid crystal dispensing method according to an embodiment of the present invention. In FIG. 4, liquid crystal material 107 may be dropped onto a lower substrate 105 having a driving device prior to assembling the lower substrate 105 and an upper substrate 103 having a color filter. Alternatively, the liquid crystal material 107 may be dropped onto the upper substrate 103 upon which the color filter is formed. For example, the liquid crystal material 107 may be formed either on a thin film transistor (TFT) substrate or on a color filter (CF) substrate.

A sealant 109 may be applied along at least an outer perimeter portion of the upper substrate 103. Then, the upper substrate 103 and the lower substrate 105 may be assembled together by pressing the upper and lower substrates 103 and 105 together to form an LCD display panel 101. Accordingly, the drops of the liquid crystal material 107 spread out between the upper and lower substrates 103 and 105 by pressure applied to the upper and/or lower substrates 103 and 105, thereby forming a liquid crystal material layer of uniform thickness between the upper substrate 103 and the lower substrate 105. Thus, in the exemplary LCD device fabrication method, the liquid crystal material 107 may be dropped onto the lower substrate 105 before the upper and lower substrates 103 and 105 are assembled together to form the LCD display panel 101.

Figure 5:
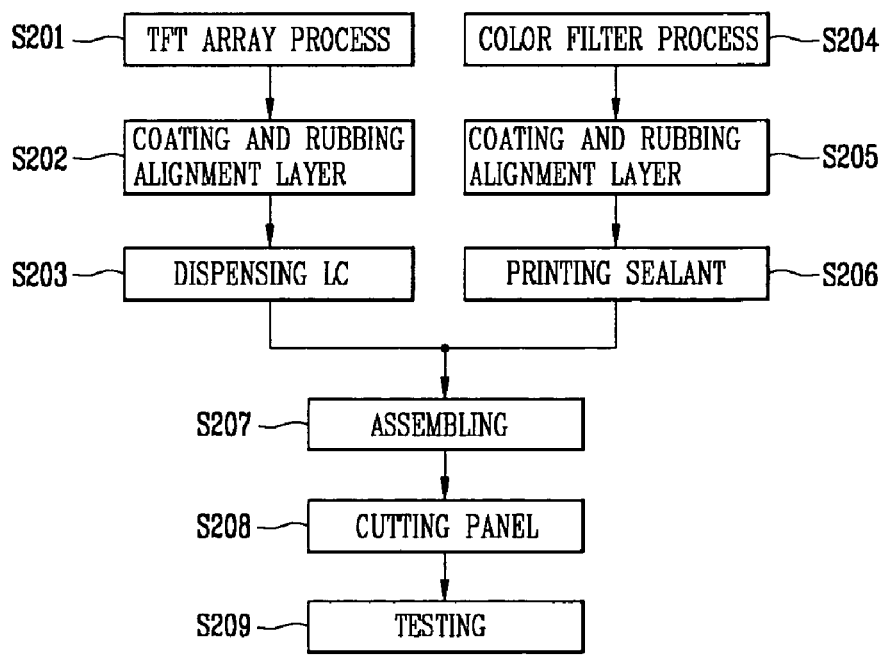
FIG. 5 is a flow chart of a fabrication method of an LCD device by a liquid crystal dispensing method according to an embodiment of the present invention.

FIG. 5 is a flow chart of an exemplary LCD device fabrication method according to an embodiment of the present invention. In Step S201, a driving device, such as a TFT, is formed on an upper substrate using a TFT array process. In Step S204, a color filter layer is formed on a lower substrate 105 using a color filter process. The TFT array process and the color filter process, which are generally similar to those of common processes, may be preferably applied to glass substrates having a plurality of unit panel areas. Herein, the upper and lower substrates may include a glass substrate having an area about 1000×1200 mm2 or more. However, glass substrates having smaller areas also may be used.

In Steps S202 and S205, alignment layers may be formed and rubbed on both the upper and lower substrates. In Step S203, liquid crystal material 107 may be dropped onto a liquid crystal display unit panel area of the lower substrate 105. In Step S206, sealant 109 is applied along at least an outer perimeter portion area of the liquid crystal display unit panel area on the upper substrate.

In Step S207, the upper and lower substrates are disposed to face each other, and compressed to join the upper and lower substrates with each other using the sealant. Accordingly, the dropped liquid crystal material evenly spreads out between the upper and lower substrates and the sealant. In Step S208, the assembled upper and lower substrates are processed and cut into a plurality of liquid crystal display unit panels. In Step S209, the liquid crystal display unit panels are tested.

Figure 1:
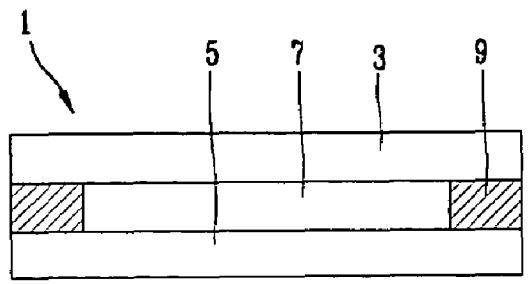
FIG. 1 is a cross sectional view of a general liquid crystal display (LCD) device according to the related art.
Figure 2:
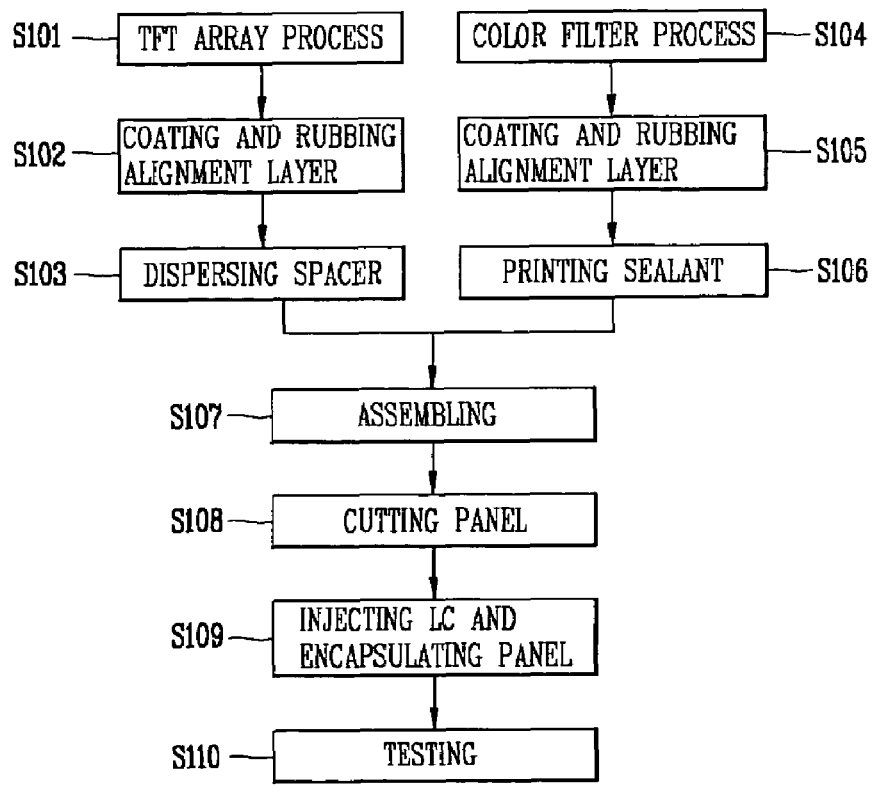
FIG. 2 is a flow chart of a fabrication method for an LCD device according to the related art.
Figure 3:
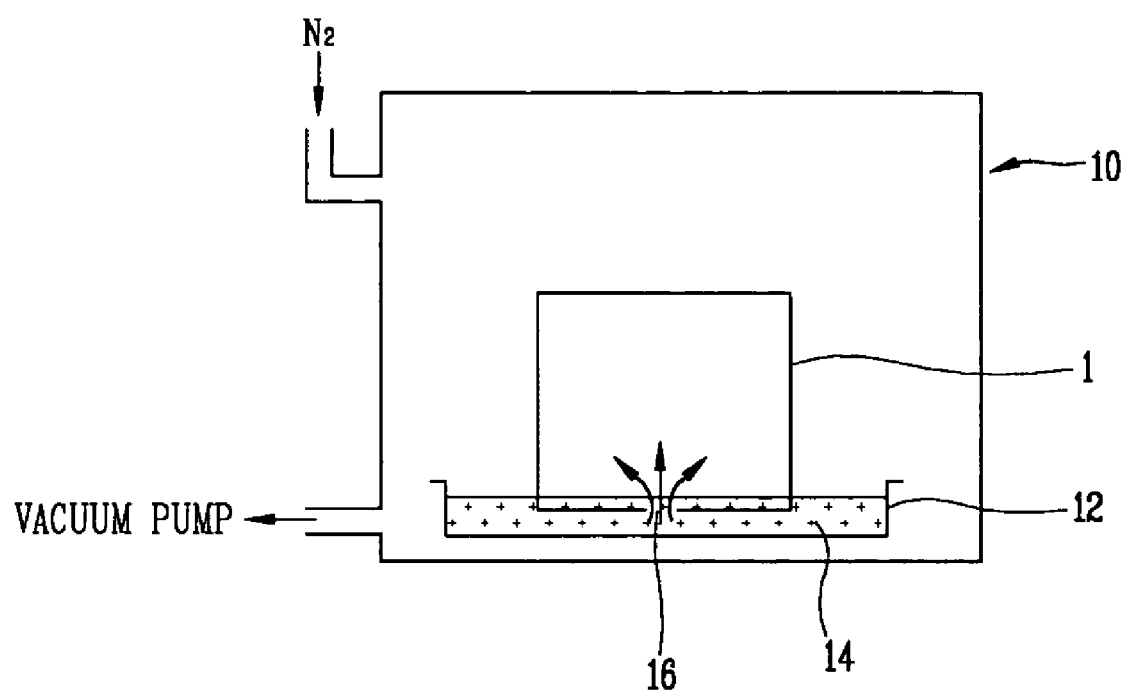
FIG. 3 is a schematic view of a liquid crystal injection system for fabricating an LCD device according to the related art.

The LCD device fabrication method using the liquid crystal dropping method of FIG. 5 is different from the LCD device fabrication method using the related art liquid crystal injection method in that a vacuum injection of liquid crystal is not used but rather a liquid crystal dropping, thereby reducing the processing time of a large area glass substrate. That is, in the LCD device fabrication method using the liquid crystal injection method of FIG. 2, liquid crystal is injected through an injection hole and then the injection hole is sealed by a sealant. However, in the LCD device fabrication method using the liquid crystal dropping method, liquid crystal is directly dropped onto the substrate and does not require the process sealing of the injection hole. Although not shown in FIG. 2, in the LCD device fabrication method using the liquid crystal injection method, the substrate is contacting the liquid crystal at the time of injecting liquid crystal so that an outer surface of the panel is contaminated by the liquid crystal. Therefore, a process for washing the contaminated substrate is required. However, in the LCD device fabrication method using the liquid crystal dropping method, liquid crystal is directly dropped onto the substrate so that the panel is not contaminated by the liquid crystal, and a washing process is not required. The LCD device fabrication method using the liquid crystal dropping method is more simple than the LCD device fabrication method using the liquid crystal injection method, thereby having an increased fabricating efficiency and an increased yield.

In the LCD device fabrication method using the liquid crystal dropping method, a dropping position of liquid crystal and a dropping amount of liquid crystal have the most influence on forming a liquid crystal layer with a desired thickness. Especially, since the thickness of a liquid crystal layer is closely related to a cell gap of a liquid crystal panel, a precise dropping position of liquid crystal and a precise amount of liquid crystal are very important to prevent inferiority of a liquid crystal panel. To drop a precise amount of liquid crystal onto a precise position, a liquid crystal dispenser is provided in the present invention.

Figure 6:
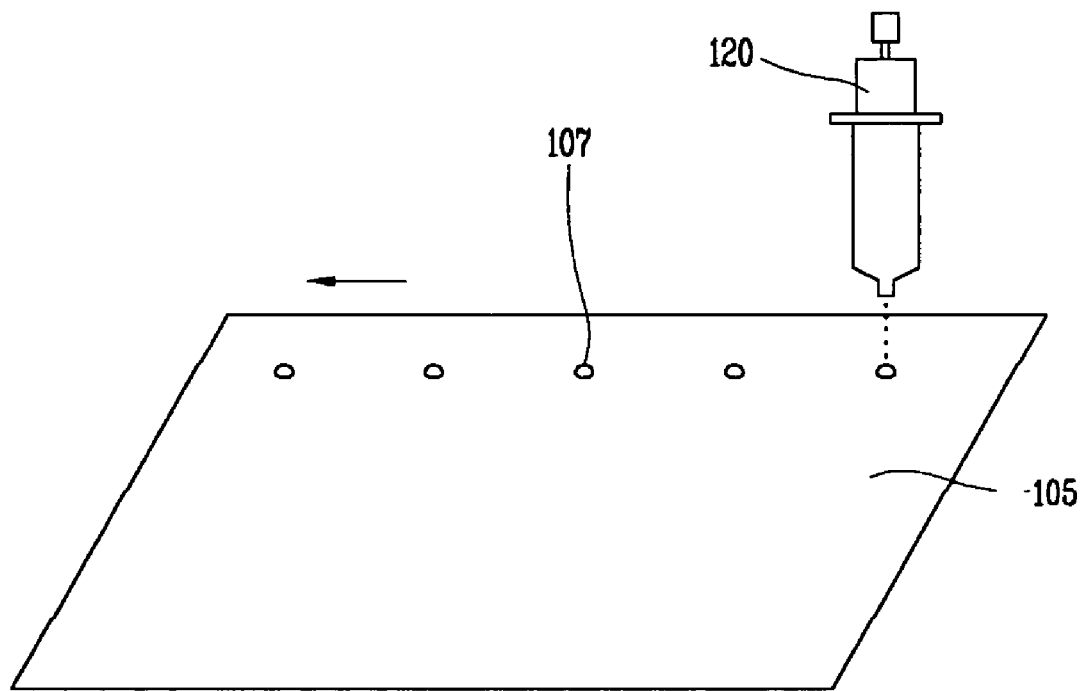
FIG. 6 is a view of a basic concept of a liquid crystal dispensing method.

FIG. 6 is a perspective view of another exemplary LCD device fabrication method according to an embodiment of the present invention. In FIG. 6, liquid crystal material 107 is dispensed onto a glass substrate 105 using a liquid crystal dispenser 120 positioned above the glass substrate 105. Although not shown, the liquid crystal material 107 may be contained in the liquid crystal dispenser 120. As the liquid crystal material 107 is dropped onto the glass substrate 105, the glass substrate 105 is moved along x- and y-directions at a predetermined speed, while the liquid crystal dispenser 120 discharges the liquid crystal material 107 at predetermined time intervals. Accordingly, the liquid crystal material 107 dropping onto the glass substrate 105 may be arranged along x- and y-directions with predetermined intervals therebetween. Alternatively, the glass substrate 105 may be fixed while the liquid crystal dispenser 120 moves along the x- and y-directions to drop the liquid crystal material 107 at predetermined intervals. However, a shape of the liquid crystal material 107 may be altered by any vibration of the liquid crystal dispenser 120, whereby errors in the dropping position and the dropping amount of the liquid crystal material 107 may occur. Therefore, it may be preferable that the liquid crystal dispenser 120 be fixed and that the glass substrate 105 be moved.

Figure 7:
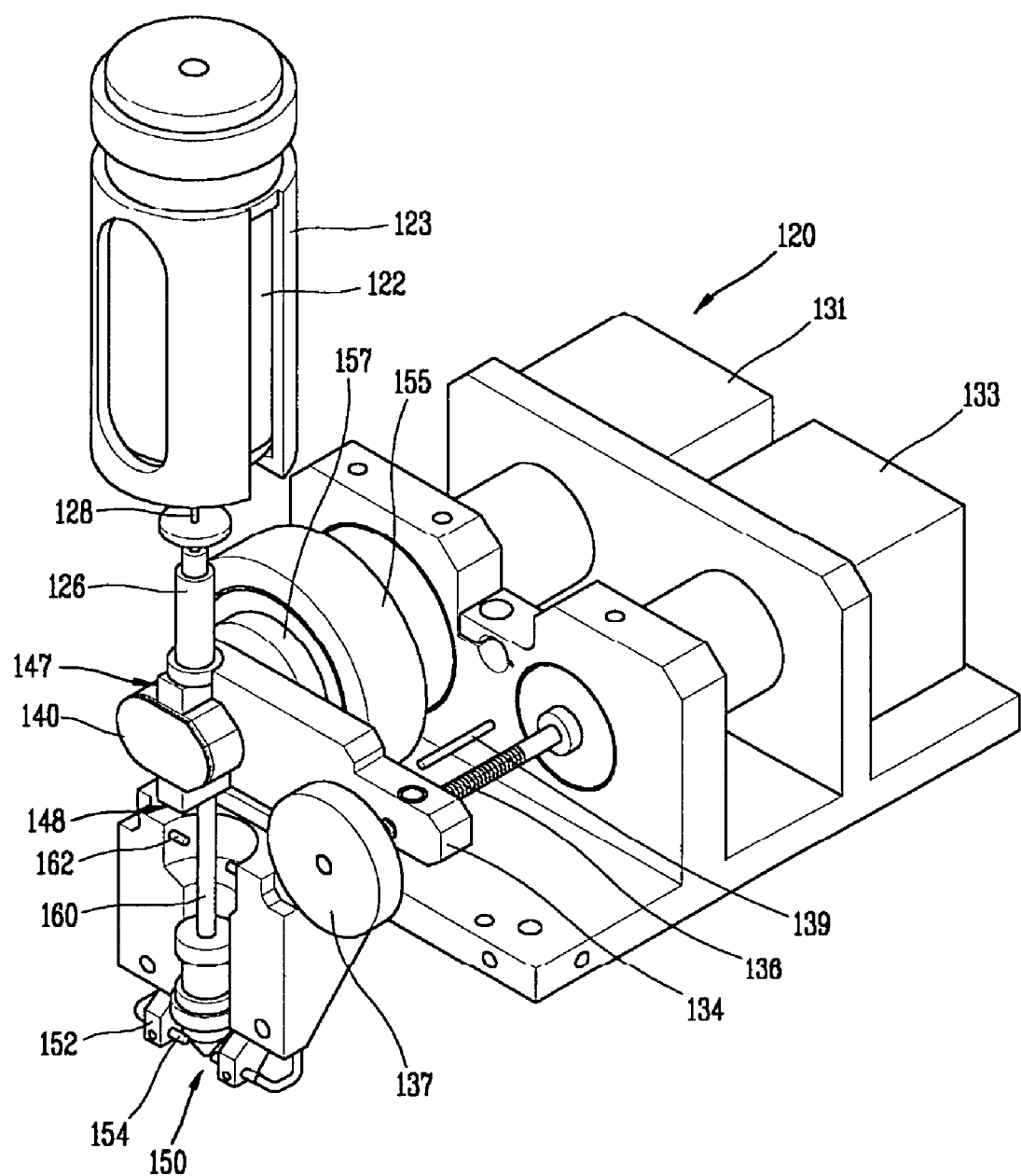
FIG. 7 is a perspective view of a liquid crystal dispenser according to an embodiment of the present invention.
Figure 8:
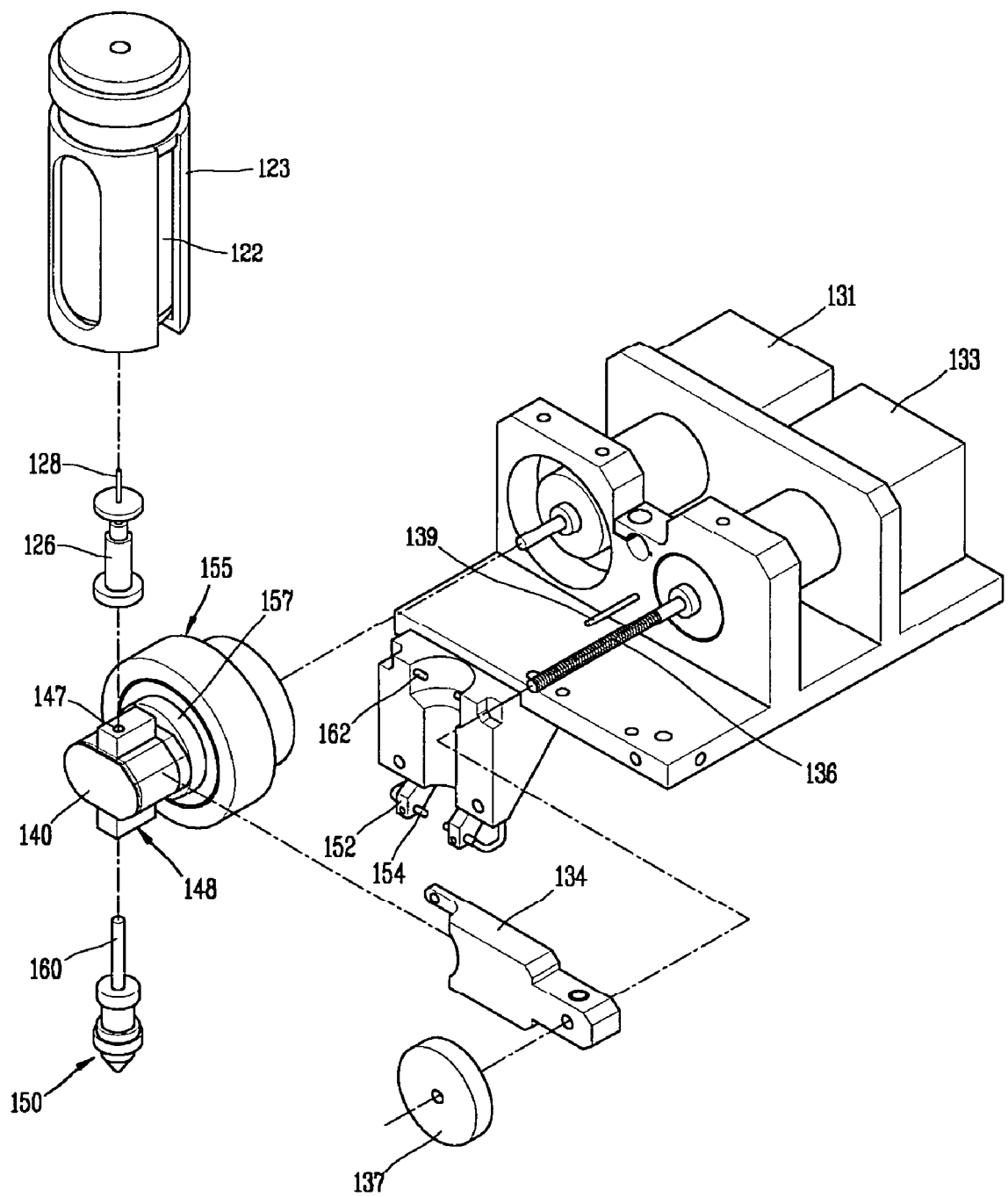
FIG. 8 is a disassembled perspective view of the liquid crystal dispenser according to an embodiment of the present invention.

FIG. 7 is a perspective view of the liquid crystal dispenser according to an embodiment of the present invention, and FIG. 8 is a disassembled perspective view of the liquid crystal dispenser according to an embodiment of the present invention. In FIGS. 7A and 7B, the liquid crystal dispenser 120 may include a cylindrically shaped liquid crystal material container 122 accommodated in a case 123. The liquid crystal material container 122 is formed of polyethylene, and the liquid crystal 107 is contained in the liquid crystal material container 122. The case 123 is formed of a stainless steel and accommodates the liquid crystal material container 122 therein. Since the polyethylene has a high plasticity, a container of a desired shape can be easily formed with the polyethylene. Also, the polyethylene is non-reactive with the liquid crystal material 107 when the liquid crystal material 107 is contained therein, thereby being mainly used as the liquid crystal material container 122. However, the polyethylene has a low strength and may therefore become easily deformed by application of stress. When the liquid crystal material container 122 is deformed, the liquid crystal material 107 may not be precisely dispensed onto a substrate. Accordingly, the liquid crystal material container 122 may be inserted within the case 123 formed of stainless steel having a high strength.

Although not shown, a gas supply tube may be arranged at an upper portion of the liquid crystal material container 122 so that inert gas, such as nitrogen, may be provided thereto. The gas is supplied within portions of the liquid crystal material container 122 not occupied by the liquid crystal material 107. Accordingly, the gas presses on the liquid crystal material 107 and induces the liquid crystal material to be dispensed onto the substrate.

The liquid crystal material container 122 may include a material that does not deform, such as stainless steel. Accordingly, when the liquid crystal material container 122 is formed of stainless steel, the case 123 may not be required, thereby reducing fabrication costs of the liquid crystal dispenser 120. The interior of the liquid crystal material container 122 may be coated with a fluorine resin such as teflon, thereby preventing the liquid crystal material 107 contained within the liquid crystal material container 122 from chemically reacting with sidewalls of the liquid crystal material container 122.

A liquid crystal discharge pump 140 is arranged at a lower portion of the liquid crystal material container 122. The liquid crystal discharge pump 140 is for discharging a certain amount of liquid crystal from the liquid crystal material container 122 to be dropped onto a substrate. The liquid crystal discharge pump 140 is provided with a liquid crystal suction opening 147 connected to the liquid crystal material container 122 for drawing in liquid crystal in accordance with the operation of the liquid crystal discharge pump 140, and a liquid crystal discharge opening 148 at the opposite side of the liquid crystal suction opening 147 for discharging liquid crystal in accordance with the operation of the liquid crystal discharge pump 140.

In FIG. 8, a first connecting tube 126 is coupled to the liquid crystal suction opening 147. Although the liquid crystal suction opening 147 is coupled to the first connecting tube 126 by being inserted as shown in the drawing, the liquid crystal suction opening 147 can be coupled to the first connecting tube 126 by a coupling member such as a screw. A pin 128 such as an injection needle of which inside is penetrated is formed at one side of the first connecting tube 126. A pad (not shown) formed of a material having a high contraction characteristic and a hermetic characteristic such as silicon or butyl rubber group material is arranged at a lower portion of the liquid crystal material container 122 for discharging liquid crystal to the first connecting tube 126. The pin 128 is inserted into the liquid crystal material container 122 through the pad, thereby introducing the liquid crystal 107 of the liquid crystal material container 122 into the liquid crystal suction opening 147. When the pin 128 is inserted into the liquid crystal material container 122, the pad forms a seal around the pin 128, thereby preventing leakage of the liquid crystal 107 to the insertion region of the pin 128. Since the liquid crystal suction opening 147 and the liquid crystal material container 122 are coupled to each other by the pin and the pad, the coupling structure is simple and the coupling/detachment is facilitated. Alternatively, the liquid crystal suction opening 147 and the first connecting tube 126 may be formed as a unit. In this case, the pin 128 is formed at the liquid crystal suction opening 147 and is directly inserted into the liquid crystal material container 122 to discharge liquid crystal, thereby having a simple structure.

A nozzle 150 is formed at a lower portion of the liquid crystal discharge pump 140. The nozzle 150 is connected to the liquid crystal discharge opening 148 of the liquid crystal discharge pump 140 through a second connecting tube 160, thereby dropping the liquid crystal 107 discharged from the liquid crystal discharge pump 140 onto the substrate. The second connecting tube 160 may be formed of an opaque material. However, the second connecting tube 160 is preferably formed of a transparent material due to the following reasons.

At the time of the liquid crystal dropping, vapor is contained in the liquid crystal 107 and a dispensing amount of the liquid crystal 107 dispensed onto the substrate can not be precisely controlled. Therefore, the vapor has to be removed at the time of the liquid crystal dropping. The vapor is already contained in the liquid crystal 107 to be contained in the liquid crystal material container 122. Even if the vapor contained in the liquid crystal 107 can be removed by a vapor removing device, the vapor is not completely removed. Also, vapor may be generated when the liquid crystal 107 is introduced into the liquid crystal discharge pump 140 from the liquid crystal material container 122. Accordingly, it is impossible to completely remove the vapor contained in the liquid crystal 107. Therefore, it preferred to remove vapor by stopping the operation of the liquid crystal dispenser at the time of the vapor occurrence. Thus by forming the second connecting tube 160 of a transparent material, inferiority of the LCD device can be prevented by easily finding vapor contained in the liquid crystal material container 122 or vapor generated from the liquid crystal material container 122. The vapor can be found by the user's naked eyes, and can be automatically detected by a first sensor 162 such as a photo coupler installed at both sides of the second connecting tube 160, in which the latter case can prevent the inferiority of the LCD device with more certainty.

The nozzle 150 into which the discharged liquid crystal is introduced through the second connecting tube 160 is provided with a protection unit 152 for protecting the nozzle 150 from external stress and etc. at both side surfaces thereof. Also, a second sensor 154 for detecting whether vapor is contained in the liquid crystal dropped from the nozzle 150 or whether liquid crystal masses on the surface of the nozzle 150 is installed at the protection unit 152 at the lower portion of the nozzle 150.

The phenomenon that the liquid crystal masses on the surface of the nozzle 150 prevents a precise dropping of the liquid crystal 107. When the liquid crystal drops through the nozzle 150, a certain amount of liquid crystal spreads on the surface of the nozzle 150 even if a preset amount of liquid crystal is discharged from the liquid crystal discharge pump 140. According to this, an amount of liquid crystal less than the preset amount is dispensed onto the substrate. Also, when the liquid crystal that masses on the surface of the nozzle 150 drops on the substrate, inferiority of the LCD device may be generated. To prevent the liquid crystal from massing on the surface of the nozzle 150, material such as a fluorine resin having a high contact angle with liquid crystal, that is a hydrophobic material, may be deposited on the surface of the nozzle 150 by a dipping method or a spray method. By the deposition of the fluorine resin, the liquid crystal does not spread on the surface of the nozzle 150 but is dispensed onto the substrate through the nozzle 150 as a perfect drop shape.

The liquid crystal discharge pump 140 is in a state of being inserted into a rotating member 157, and the rotating member 157 is fixed to a fixing unit 155. The rotating member 157 is connected to a first motor 131. As the first motor 131 is operated, the rotating member 157 is rotated and the liquid crystal discharge pump 140 fixed to the rotating member 157 is operated.

The liquid crystal discharge pump 140 is in contact with one side of a liquid crystal capacity amount controlling member 134 having a bar shape. A hole is formed at another side of the liquid crystal capacity amount controlling member 134, and a rotational shaft 136 is inserted into the hole. A screw is provided at the perimeter of the hole of the liquid crystal capacity amount controlling member 134 and the rotational shaft 136 so that the liquid crystal capacity amount controlling member 134 and the rotational shaft 136 are screw-coupled to each other. One end of the rotational shaft 136 is connected to a second motor 133, and another end thereof is connected to a controlling lever 137.

The discharge amount of liquid crystal from the liquid crystal material container 122 through the liquid crystal discharge pump 140 is varied according to a fixation angle of the liquid crystal discharge pump 140 to the rotating member 157. That is, a liquid crystal capacity amount of the liquid crystal discharge pump 140 is varied according to an angle that the liquid crystal discharge pump 140 is fixed to the rotating member 157. When the second motor 133 connected to the rotational shaft 136 is driven (automatically controlled) or the controlling lever 137 is operated (manually controlled), the rotational shaft 136 is rotated. According to this, one end of the liquid crystal capacity amount controlling member 134 screw-coupled to the rotational shaft 136 moves back and forth (linear direction) along the rotational shaft 136. Accordingly, as one end of the liquid crystal capacity amount controlling member 134 moves, a force applied to the liquid crystal discharge pump 140 is varied, and therefore, the fixation angle of the liquid crystal discharge pump 140 is varied.

As aforementioned, the first motor 131 operates the liquid crystal discharge pump 140 to discharge liquid crystal of the liquid crystal material container 122 and to drop the liquid crystal onto the substrate. Also, the second motor 133 controls the fixation angle of the liquid crystal discharge pump 140 fixed to the rotating member 157 to control the amount of liquid crystal discharged from the liquid crystal discharge pump 140.

A single dispensing amount of liquid crystal dropped onto the substrate through the liquid crystal discharge pump 140 is very minute, and therefore, a variation amount of the liquid crystal discharge pump 140 controlled by the second motor 133 is also minute. Accordingly, to control the discharge amount of the liquid crystal discharge pump 140, an inclination angle of the liquid crystal discharge pump 140 has to be controlled very precisely. For the precise control, a servo motor or preferably a step motor operated by a pulse input value is used as the second motor 133.

Figure 9A:
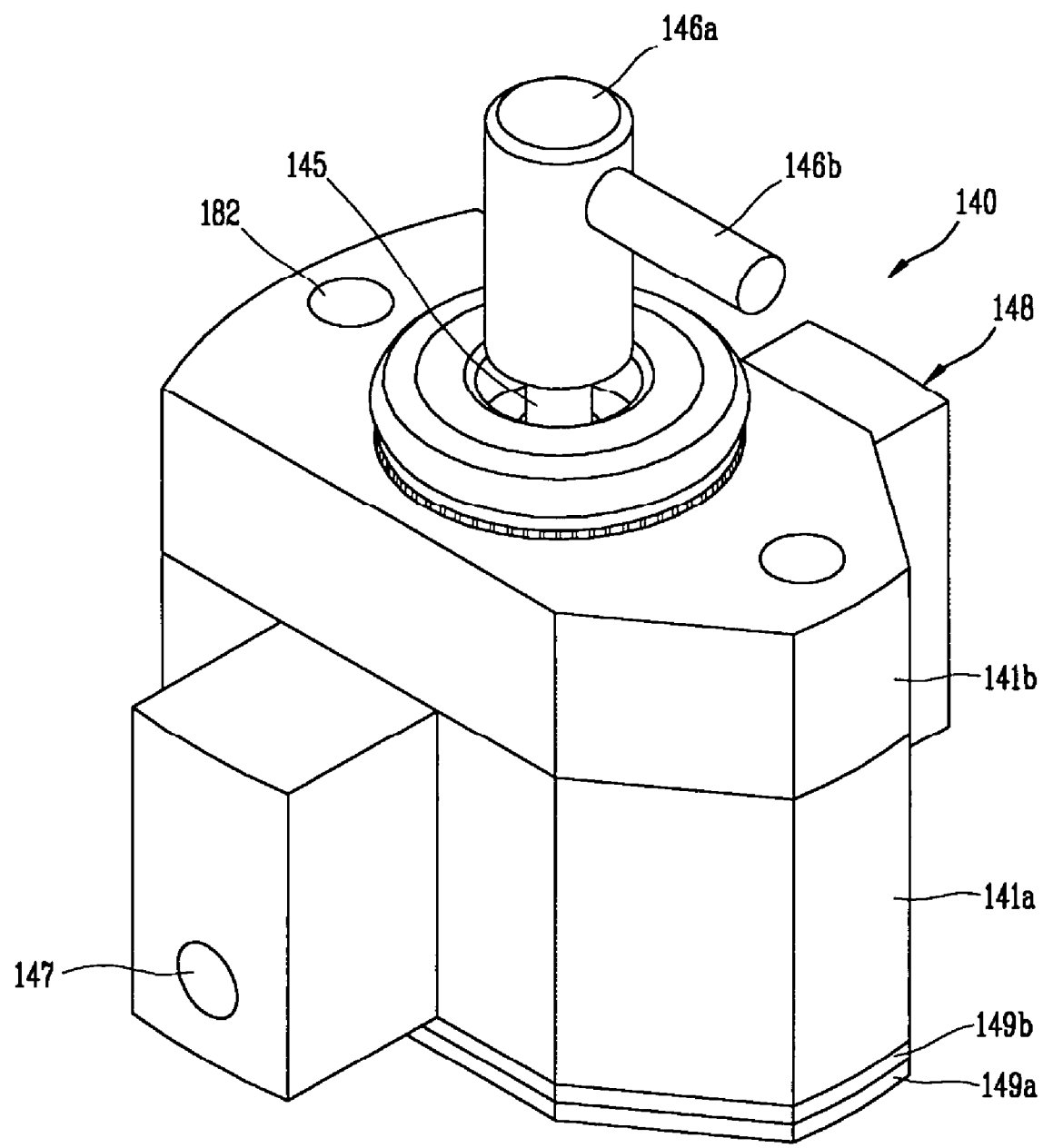
FIG. 9A is a perspective view of a liquid crystal discharge pump of the liquid crystal dispenser according to an embodiment of the present invention.
Figure 9B:
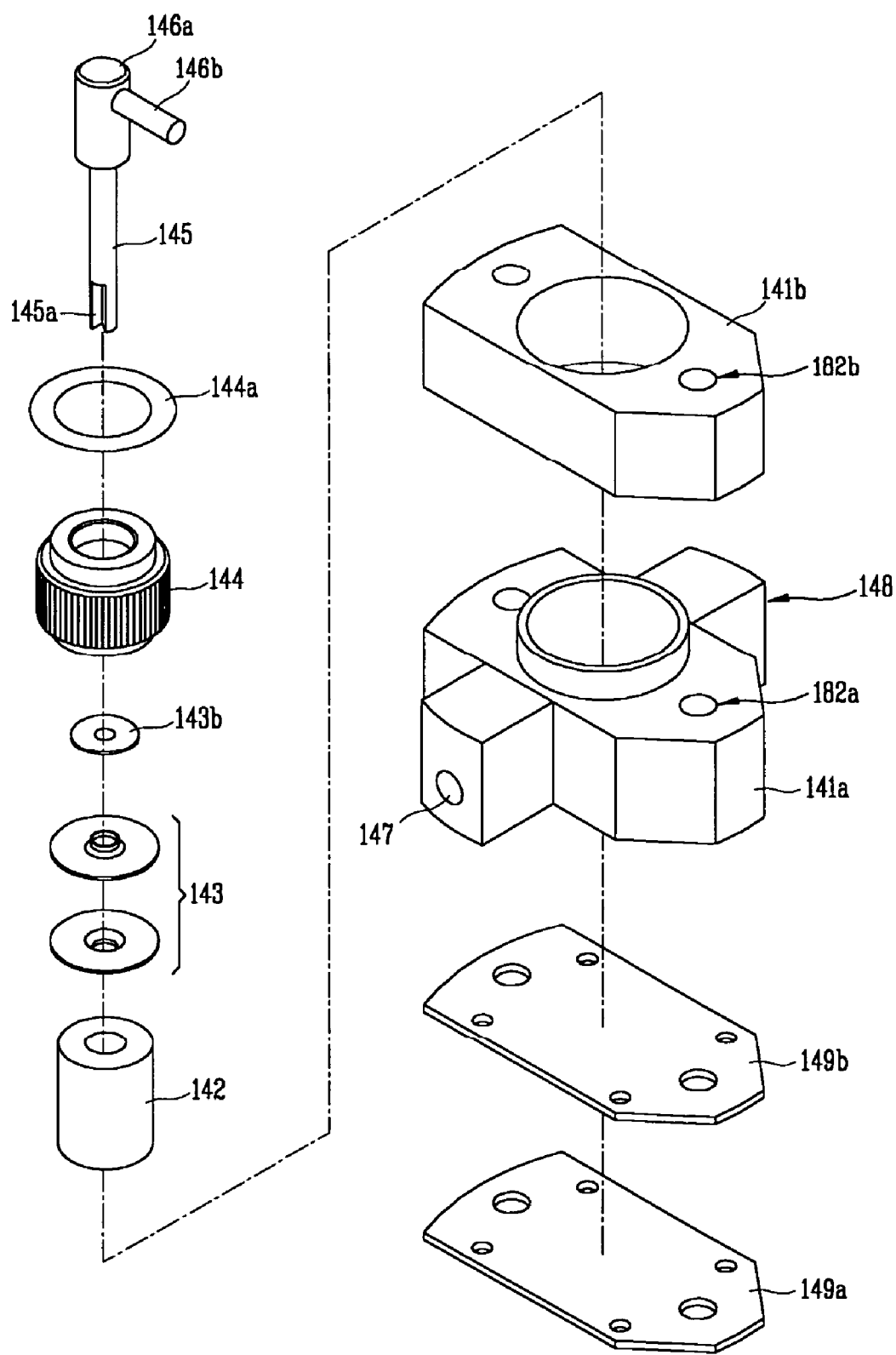
FIG. 9B is a disassembled perspective view of the liquid crystal discharge pump.

FIG. 9A is a perspective view of the liquid crystal discharge pump, and FIG. 9B is a disassembled perspective view of the liquid crystal discharge pump. In FIGS. 9A and 9B, the liquid crystal discharge pump 140 includes: cases 141a and 141b having the liquid crystal suction opening 147 and the liquid crystal discharge opening 148; a cylinder 142 inserted into the cases 141a and 141b for drawing in liquid crystal; and a piston 145 inserted in the cylinder 142 to be moved in up-down directions and to be rotated in order to draw in and discharge the liquid crystal 107 through the liquid crystal suction opening 147 and the liquid crystal discharge opening 148. The case includes separable first and second cases 141a and 141b formed of a stainless steel to be impact and deformation resistant. The liquid crystal suction opening 147 and the liquid crystal discharge opening 148 are formed at the first case 141a or at the second case 141b. However, to draw in and discharge liquid crystal into the cylinder 142, it is preferable to form the liquid crystal suction opening 147 and the liquid crystal discharge opening 148 at the first case 141a positioned at the lower portion. Also, two bottom surfaces 149a and 149b of Teflon are formed at a lower portion of the first case 141a. The reason why the bottom surfaces 149a and 149b are formed of Teflon is to completely seal the bottom surfaces. Of course, one bottom surface or bottom surfaces more than three bottom surfaces may be formed instead of two bottom surfaces. The bottom surfaces 149a and 149b can be considered as another case. In this respect, the case of the liquid crystal discharge pump 140 can be considered to be composed of three separable cases.

The case can be fabricated as an integral type, but it is very difficult to wash the liquid crystal discharge pump 140. Generally, a dispensing amount of liquid crystal from the liquid crystal dispenser to the substrate is very minute. Therefore, when liquid crystal remains at the liquid crystal discharge pump at the time of dispensing liquid crystal or at the time of discharging liquid crystal, liquid crystal being dispensed is greatly influenced by the remaining liquid crystal, thereby causing defects or inferiorities in the LCD device. Also, the remaining liquid crystal contaminates liquid crystal. Therefore, after dispensing liquid crystal as much as a preset number of times (onto a preset number of sheets of the substrate or the liquid crystal panels), the liquid crystal discharge pump 140 has to be washed, thereby removing the remaining liquid crystal. However, if the case is formed as an integral type, it is very hard to completely wash the liquid crystal discharge pump 140. As a result, the case is separably formed thus to enable the liquid crystal discharge pump 140 to be easily washed.

The first case 141a and the second case 141b are provided with coupling holes 182 for coupling the first case 141a and the second case 141b. A screw is inserted into the coupling holes 182, thereby tightly coupling the first case 141a and the second case 141b. The coupling holes 182 are also formed at the bottom surfaces 149a and 149b of the lower portion of the cases 141a and 141b, thereby tightly coupling the bottom surfaces 149a and 149b to the first case 141a and the second case 141b.

A cap 144 is coupled to the upper portion of the case 141b. An opening is formed at the upper portion of the cap 144, and the piston 145 is inserted into the cylinder 142 through the opening. A first sealing member 143a and a second sealing member 143b formed of Teflon for sealing the cylinder 142 are formed between the cylinder 142 and the cap 144. Even if a plurality of the first sealing member 143a were formed in drawing, one first sealing member 143a can be formed. At least two second sealing member 143b for improving the sealing effect can be additionally formed or the second sealing member 143b can be omitted. An O-ring 144a is positioned at an upper portion of the cap 144 thus to prevent the liquid crystal 107 from being leaked.

When the case of the liquid crystal discharge pump is formed of stainless steel and includes three separable cases having the bottom surface, the following effects can be obtained. First, the washing of the liquid crystal discharge pump is facilitated. As a result, an inaccurate dispensing of liquid crystal due to the remaining liquid crystal or a liquid crystal contamination can be prevented. Second, the deformation of the case can be prevented. The liquid crystal discharge pump has to be continuously operated to dispense liquid crystal onto the substrate. According to this, a continuous impact is applied to the liquid crystal discharge pump. Herein, since the case is formed as a separable type, the case is deformed, thereby mis-aligning the case. However, in accordance with the present invention, since the case is formed of stainless steel, the deformation due to the impact can be prevented and thereby the mis-alignment of the case due to the deformation can be prevented. According to this, the inferiority of the LCD device due to the inaccurate liquid crystal dispensing can be prevented. Third, since the first and second cases 141a and 141b are tightly coupled to the bottom surfaces 149a and 149b by the screw of the coupling holes, the cylinder 142, the sealing members 143a and 143b, the cap 144, and other components disposed therein are greatly adhered to one another, thereby enabling a more precise dispensing of liquid crystal.

A head 146a fixed to the rotating member 157 is installed at a portion above the piston 145, and a bar 146b is installed at the head 146a. The bar 146b is inserted into a hole (not shown) of the rotating member 157 and is fixed, thereby rotating the piston 145 when the rotating member 157 is rotated by a force of the first motor 131.

In FIG. 9B, a groove 145a is formed at the end of the piston 145. The groove 145a has an area corresponding to approximately ¼ (or less than that) of a sectional area of a circle shape of the piston 145. The groove 145a opens and closes the liquid crystal suction opening 147 and the liquid crystal discharge opening 148 when the piston 145 is rotated (that is, moved up and down), thereby drawing in and discharging liquid crystal through the liquid crystal suction opening 147 and the liquid crystal discharge opening 148.

Operation of the liquid crystal discharge pump 140 will be explained as follows.

Figure 10:
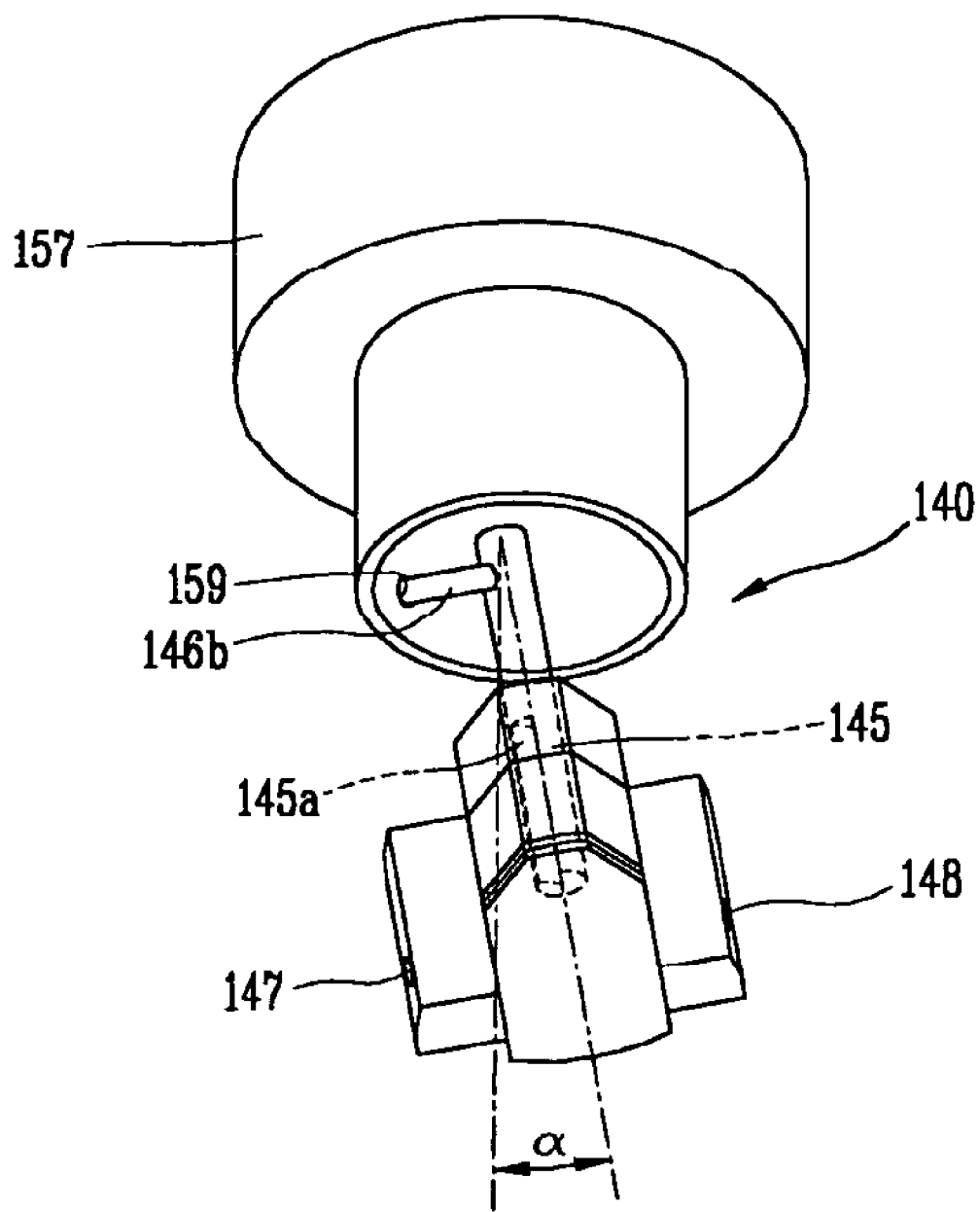
FIG. 10 is a view showing a state that the liquid crystal discharge pump is fixed to a fixing unit.

FIG. 10 is a view showing a state that the liquid crystal discharge pump 140 is fixed to the rotating member 157. In FIG. 10, the piston 145 is fixed to the rotating member 157 with a certain angle ($\alpha$). The bar 146b formed at the piston head 146a is inserted into a hole 159 formed inside the rotating member 157 so that the piston 145 and the rotating member 157 are coupled to each other. Although not shown, a bearing is provided inside the hole 159 and thereby the bar 146b of the piston 145 inserted into the hole 159 can move back and forth and right and left. When the first motor 131 is operated, the rotating member 157 is rotated and thereby the piston 145 coupled to the rotating member 157 is rotated.

Herein, if the fixation angle ($\alpha$) of the liquid crystal discharge pump for the rotating member 157, that is, the fixation angle ($\alpha$) of the piston 145 for the rotating member 157 is supposed to be 0, the piston 145 performs only a rotational motion along the rotating member 157. However, since the fixation angle ($\alpha$) of the piston 145 is not substantially zero (that is, the piston 145 is fixed with a certain angle), the piston 145 not only rotates along the rotating member 157 but also up-down moves.

If the piston 145 moves upwardly by rotating with a certain angle, a space is formed inside the cylinder 142 and liquid crystal is drawn into the space through the liquid crystal suction opening 147. Then, if the piston 145 moves downwardly by rotating more, the liquid crystal in the cylinder 142 is discharged through the liquid crystal discharge opening 148. Herein, the groove 145a formed at the piston 145 opens and closes the liquid crystal suction opening 147 and the liquid crystal discharge opening 148 at the time of drawing in and discharging the liquid crystal by the rotation of the piston 145.

Figure 11A:
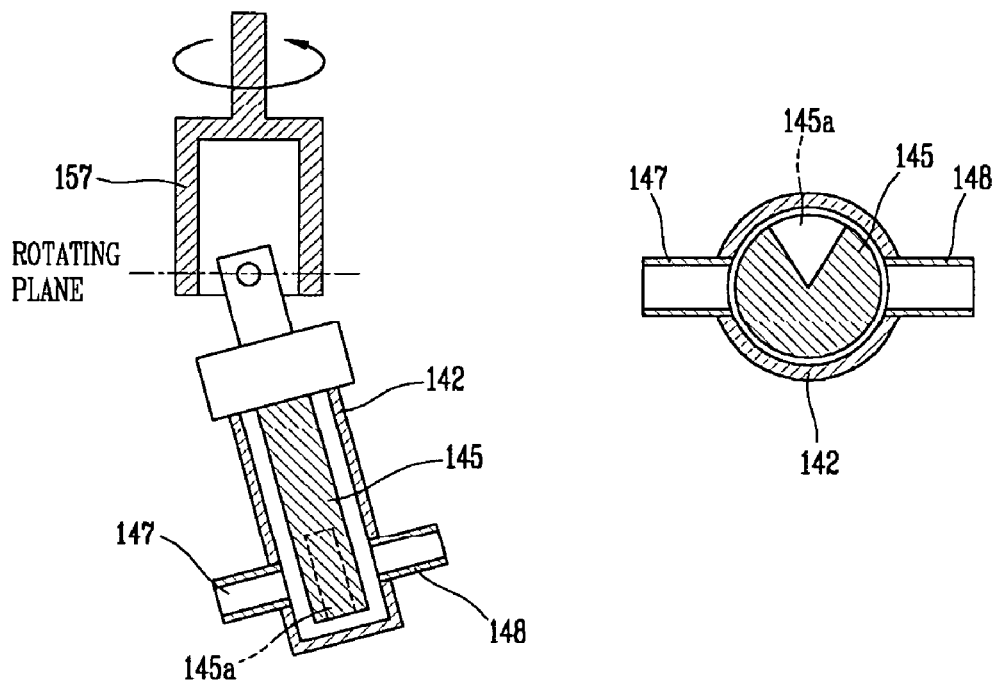
FIGS. 11A to 11D are operational views of the liquid crystal discharge pump.
Figure 11B:
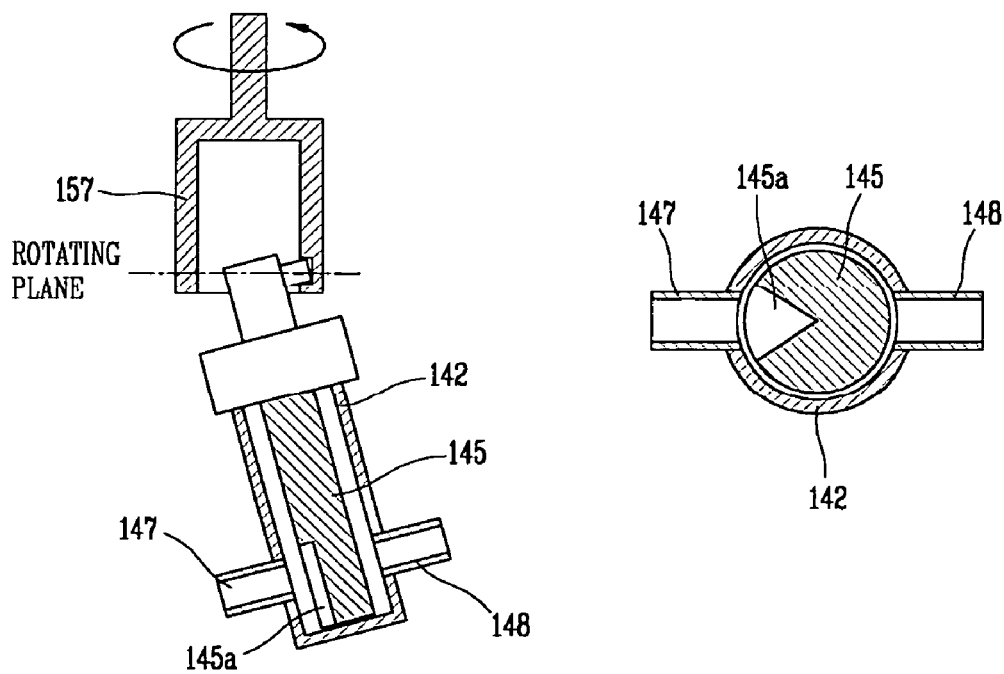
Figure 11C:
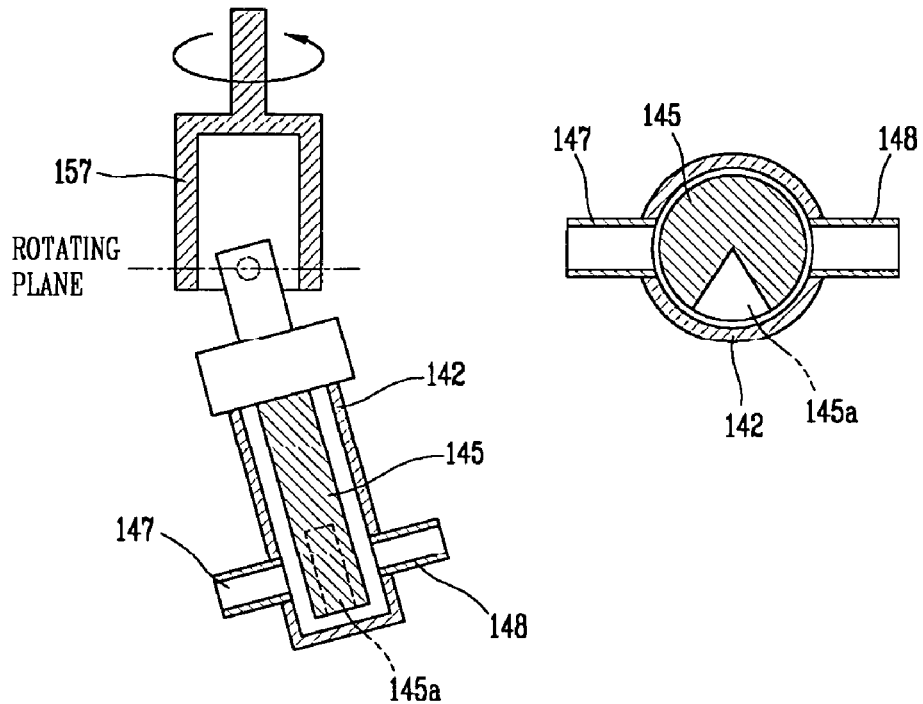
Figure 11D:
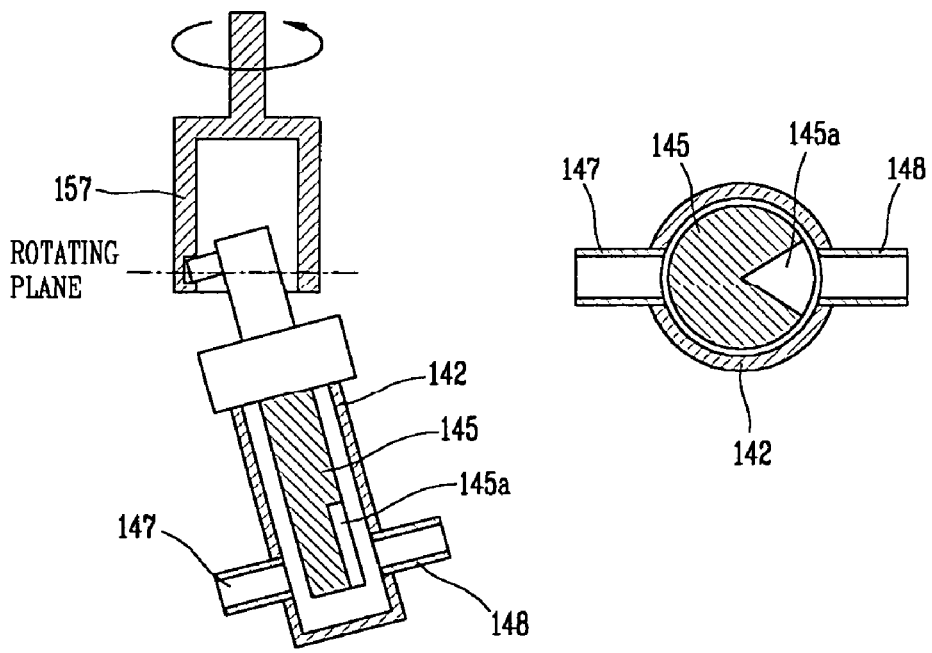

Hereinafter, operation of the liquid crystal disc charge pump 140 will be explained in more detail with reference to FIGS. 11A to 11D. In FIGS. 11A to 11D, the liquid crystal discharge pump 140 discharges the liquid crystal 107 of the liquid crystal material container 122 to the nozzle 150 through 4 strokes. FIGS. 11A and 11C are cross strokes, FIG. 11B is a suction stroke through the liquid crystal suction opening 147, and FIG. 11D is a discharge stroke through the liquid crystal discharge opening 148.

In FIG. 11A, the piston 145 fixed to the rotating member 157 with a certain angle (a) rotates accordingly as the rotating member 157 rotates. At this time, the liquid crystal suction opening 147 and the liquid crystal discharge opening 148 are closed by the piston 145.

When the rotating member 157 rotates with approximately 45°, the piston 145 rotates and the liquid crystal suction opening 147 is open by the groove 145a of the piston 145 as shown in FIG. 11B. The bar 146b of the piston 145 is inserted into the hole 159 of the rotating member 157, thereby coupling the rotating member 157 and the piston 145. Accordingly, as the rotating member 157 rotates, the piston 145 rotates. At this time, the bar 146b rotates along a rotating plane.

Since the piston 145 is fixed to the rotating member 157 with a certain angle and the bar 146b rotates along the rotating plane, the piston 145 moves upwardly accordingly as the rotating member 157 rotates. Also, accordingly as the rotating member 157 rotates, a space is formed at the cylinder 142 positioned at the lower portion of the piston 145 since the cylinder 142 is fixed. Therefore, liquid crystal is drawn into the space through the liquid crystal suction opening 147 that has been open by the groove 145a. The suction stroke of liquid crystal continues until the suction stroke of FIG. 11C starts (the liquid crystal suction opening 147 is closed) as the rotating member 157 rotates with approximately 45° after the suction stroke starts (that is, the liquid crystal suction opening 147 is open).

Then, as shown in FIG. 11D, the liquid crystal discharge opening 148 is open and the piston 145 downwardly moves accordingly as the rotating member 157 rotates more so that the liquid crystal drawn into the space inside the cylinder 142 is discharged through the liquid crystal discharge opening 148 (discharge stroke). As aforementioned, the liquid crystal discharge pump 140 repeats four strokes (that is, the first cross stroke, the suction stroke, the second cross stroke, and the discharge stroke), thereby discharging the liquid crystal 107 contained in the liquid crystal material container 122 to the nozzle 150. Herein, the discharge amount of liquid crystal is varied according to an up-down motion range of the piston 145. The up-down motion range of the piston 145 is varied according to the angle of the liquid crystal discharge pump 140 fixed to the rotating member 157.

Figure 12:
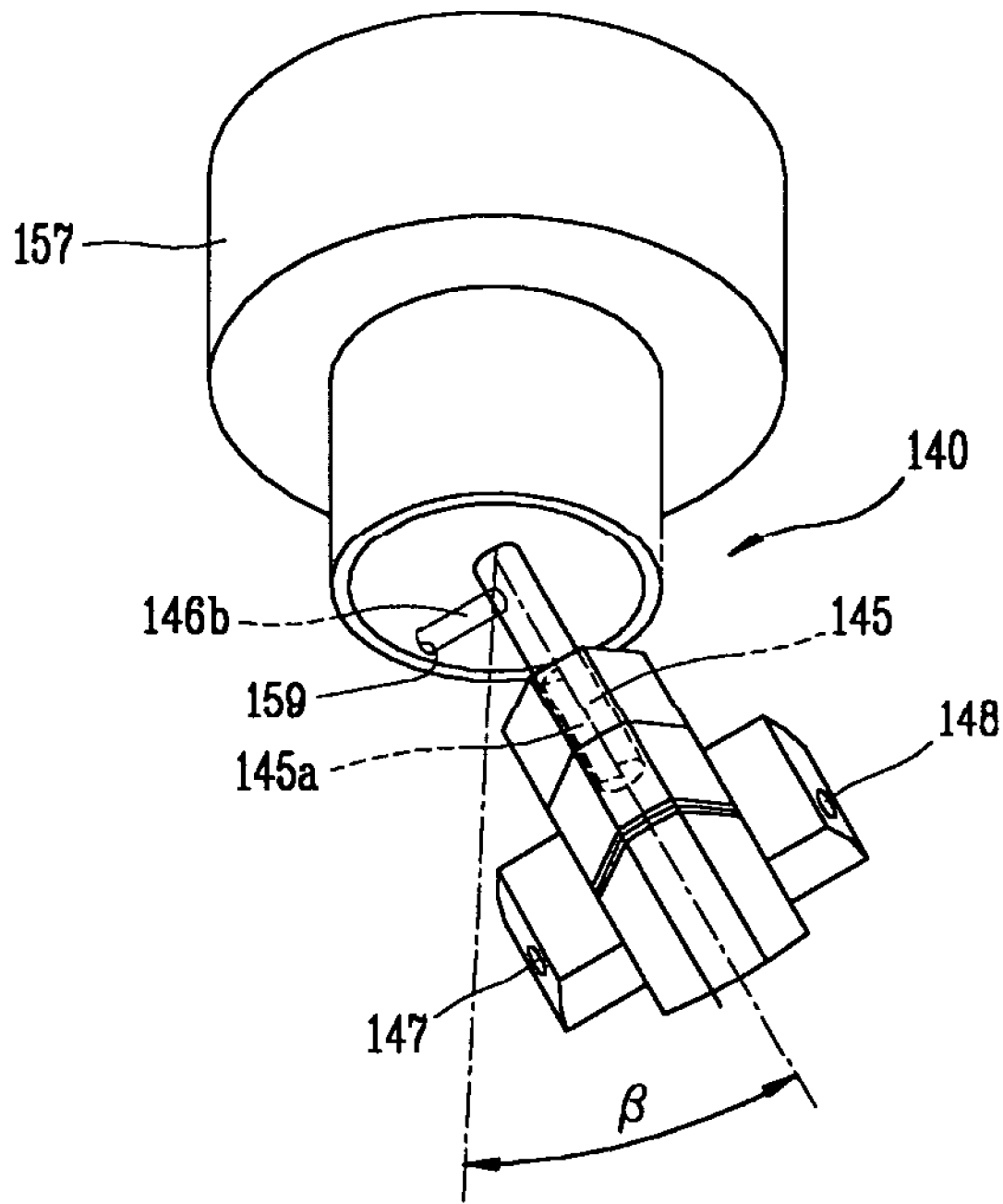
FIG. 12 is a view of the liquid crystal discharge pump of which a fixation angle has been increased.

FIG. 12 shows a liquid crystal discharge pump 140 with the piston 145 fixed to the rotating member 157 with an angle of $\beta$. When compared to the liquid crystal discharge pump 140 of FIG. 10 having the piston 145 fixed to the rotating member 157 with the angle of $\alpha$, the liquid crystal discharge pump 140 of FIG. 12 having the piston 145 fixed to the rotating member 157 with an angle of $\beta(>\alpha)$ enables the piston 145 to upwardly move more highly. That is, the greater the angle of the liquid crystal discharge pump 140 relative to the rotating member 157 is, the greater the amount of the liquid crystal 107 drawn into the cylinder 142 at the time of the piston motion is. This means that the discharge amount of liquid crystal can be controlled by adjusting the angle of the liquid crystal discharge pump 140 fixed to the rotating member 157.

The angle of the liquid crystal discharge pump 140 fixed to the rotating member 157 is controlled by the liquid crystal capacity amount controlling member 134 of FIG. 7, and the liquid crystal capacity amount controlling member 134 is moved by driving the second motor 133. That is, the angle of the liquid crystal discharge pump 140 fixed to the rotating member 157 is controlled by controlling the second motor 133.

The fixation angle of the liquid crystal discharge pump 140 can be manually adjusted by handling the angle controlling lever 137 by the user. However, in this case, a precise adjustment is not possible, a lot of time is required, and the driving of the liquid crystal discharge pump has to be stopped during the operation. Therefore, it is preferable to adjust the fixation angle of the liquid crystal discharge pump 140 by the second motor 133. The fixation angle of the liquid crystal discharge pump 140 is measured by a sensor 139 such as a linear variable differential transformer. If the fixation angle exceeds a preset angle, the sensor 139 rings the alarm thus to prevent the liquid crystal discharge pump 140 from being damaged.

As aforementioned, in accordance with the present invention, since the case of the liquid crystal discharge pump is separably formed and is formed of stainless steel, the following effects can be obtained. First, the washing of the liquid crystal discharge pump is facilitated. As a result, inaccurate liquid crystal dispensing due to the remaining liquid crystal or the liquid crystal contamination can be prevented. Second, deformation of the case is prevented. As a result, mis-alignment of the case due to the deformation can be prevented, thereby enabling precise liquid crystal dispensing. Third, since the case and the bottom surface are tightly coupled to each other by the screw of the coupling hole, the cylinder, the sealing members, the cap, and other components disposed therein are greatly adhered to one another, thereby enabling a more precise dispensing of liquid crystal.

Is should be recognized that a the present invention may be varied from the exemplary embodiments shown and described. For example, the liquid crystal dispensing apparatus may be able to read information of a liquid crystal container as described in Korean Patent Application No. 2003-41277, which is hereby incorporated by reference. Also, the liquid crystal dispensing apparatus may be adapted to use spacer information as described in Korean Patent Application No. 2003-41275, which is hereby incorporated by reference.

It will be apparent to those skilled in the art that various modifications and variations can be made in the liquid crystal dispensing system and method of dispensing liquid crystal material using the same of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus, comprising:
a container to contain liquid crystal;
a discharge pump unit coupled to the container, the discharge pump unit including a case, cylinder received in the case, a piston inserted into the cylinder and having a groove at a lower portion such that the piston draws in and discharges liquid crystal by rotating and moving up-down; and
a nozzle unit separably coupled to the discharge pump unit to dispense liquid crystal from the discharge pump onto a substrate,
wherein the case includes a cap, first and second cases formed of a metal and at least two bottom surfaces formed of a fluorine resin separably coupled to each other, and the second case coupled to the at least two bottom surfaces includes a suction opening and a discharge opening through which liquid crystal is drawn in and discharged as the piston moves inside the cylinder, the cap being disposed at one end portion of the first case and the at least two bottom surfaces being disposed at another end portion of the second case opposing to the end portion of the first case coupled to the container.

2. The apparatus according to claim 1, further comprising a rotating member to which the piston of the discharge pump is coupled in order to rotate the piston and to move the piston up-down in accordance with the rotation.

3. The apparatus according to claim 2, wherein the piston is provided with a bar, the rotating member is provided with a hole, and the bar is rotatably inserted into the hole so that the piston is coupled with the rotating member.

4. The apparatus according to claim 3, wherein a liquid crystal capacity amount of the discharge pump is variable according to a fixation angle of the piston to the rotating member.

5. The apparatus according to claim 1, further comprising a liquid crystal capacity amount controlling member contacting the discharge pump to vary a fixation angle of the discharge pump in order to control a liquid crystal discharge amount.

6. The apparatus according to claim 5, further comprising:
a motor to drive the liquid crystal capacity amount controlling member; and
a rotational shaft coupled to the liquid crystal capacity amount controlling member to be rotated as the motor is driven in order to linearly move the liquid crystal capacity amount controlling member.

7. The apparatus according to claim 6, wherein the motor includes one of a servo motor and a step motor.

8. The apparatus according to claim 1, further comprising:
a first connecting tube connecting the container and the discharge pump; and
a pin installed at the end of the first connecting tube inserted into the container and penetrated into the container to introduce liquid crystal from the container.

9. The apparatus according to claim 8, further comprising a second connecting tube to connect the discharge pump and the nozzle.

10. The apparatus according to claim 9, wherein the second connecting tube is formed of a transparent material.

11. The apparatus according to claim 10, further comprising a first sensor installed near the second connecting tube to detect whether vapor is contained in liquid crystal discharged from the discharge pump.

12. The apparatus according to claim 11, further comprising a second sensor installed near the nozzle to detect whether liquid crystal is massed on the surface of the nozzle.

13. The apparatus according to claim 1, wherein the case is formed of stainless steel.

14. The apparatus according to claim 1, further comprising a coupling hole to couple the first case and the second case.

15. The apparatus according to claim 1, wherein a coupling hole is formed at each of the at lease two bottom surfaces to couple the at least two bottom surfaces with the first case and the second case.

16. The apparatus according to claim 1, further comprising a first sealing unit inserted into the case to seal the case.

17. The apparatus according to claim 16, further comprising a second sealing unit having a fluorine resin to seal the case.

18. A liquid crystal dispensing apparatus, comprising:
a container to contain liquid crystal;
a discharge pump unit coupled to the container, the discharge pump unit having a case and a piston inserted into the case to draw in and discharge liquid crystal in accordance with an up-down motion of the piston; and
a nozzle unit separably coupled to the discharge pump unit to dispense liquid crystal from the discharge pump onto a substrate,
wherein the case includes a plurality of bodies formed of a metal and at least two bottom surfaces formed of a fluorine resin separably coupled to each other, and the one of the pluratily of bodies coupled include a suction opening and a discharge opening through which liquid crystal is drawn in and discharged as the piston moves, the at least two bottom surfaces being disposed at an opposing end portion of the coupled plurality of bodies to the container.

* * * * *